(12) United States Patent
O'Brien et al.

(10) Patent No.: US 6,935,805 B2
(45) Date of Patent: Aug. 30, 2005

(54) HIGH RELIABILITY PRECISION LATCH

(75) Inventors: Michael J. O'Brien, Rochester, NY (US); Richard A. Colleluori, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1 day.

(21) Appl. No.: 10/687,440

(22) Filed: Oct. 16, 2003

(65) Prior Publication Data

US 2005/0084325 A1 Apr. 21, 2005

(51) Int. Cl.[7] ............................................. F16B 21/00
(52) U.S. Cl. .................. 403/322.1; 403/323; 403/325; 403/327; 403/330; 244/158 R; 294/96; 294/166
(58) Field of Search ............................. 403/321, 322.1, 403/322.3, 323, 325–327, 330; 294/94–96, 294/101, 116; 292/25, 27, 341.15, 341.16; 244/158 R

(56) References Cited

U.S. PATENT DOCUMENTS

| | | | |
|---|---|---|---|
| 422,739 A | * | 3/1890 | Darmstadt .................. 292/25 |
| 3,445,133 A | * | 5/1969 | Reischl ...................... 294/82.1 |
| 4,368,913 A | * | 1/1983 | Brockmann et al. ........ 294/106 |
| 4,431,333 A | | 2/1984 | Chandler |
| 4,508,296 A | | 4/1985 | Clark |
| 4,682,804 A | | 7/1987 | Palmer et al. |
| 4,905,938 A | * | 3/1990 | Braccio et al. ............. 244/101 |

* cited by examiner

Primary Examiner—Daniel P. Stodola
Assistant Examiner—Michael P. Ferguson
(74) Attorney, Agent, or Firm—RatnerPrestia

(57) ABSTRACT

A reusable self-aligning precision latch, including a latch body for mounting a latch assembly, and an interface cone. A lead screw, coupled to the latch body on one end, pivots at an interface on the latch body allowing for self-alignment. A drive cam having a plurality of surfaces and positioned on the lead screw engages a plurality of linkage assemblies such that at least two links are driven. A flexure ball assembly clamped by the plurality of linkage assemblies to the latch body with a pivoting clamp plate such that all clamping forces between the pivoting clamp plate and the latch body are equalized. A motor for closing and opening the self-aligning precision latch by turning the lead screw to apply and release, respectively, the clamping forces between the pivoting clamp plate and the latch body.

16 Claims, 14 Drawing Sheets

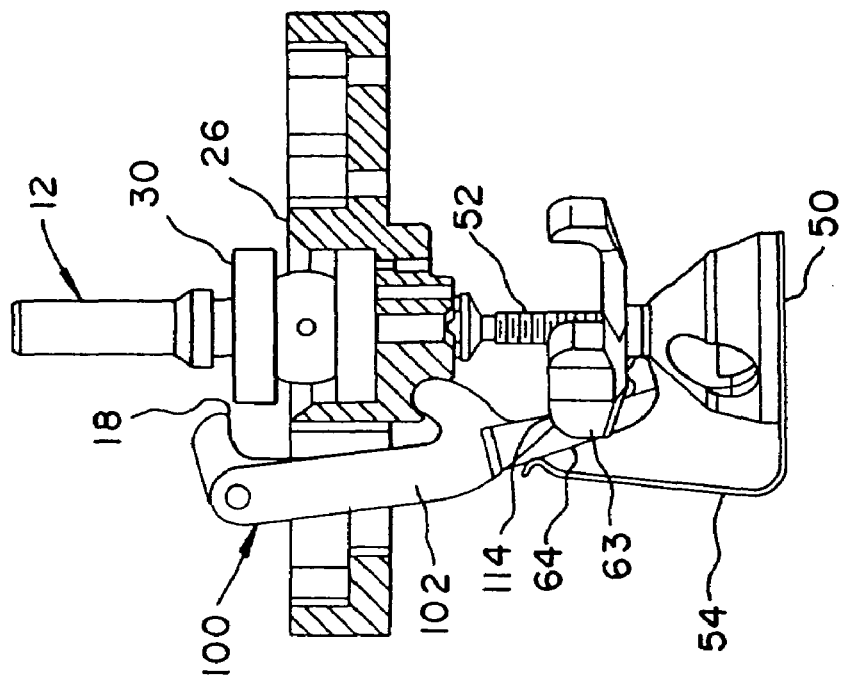
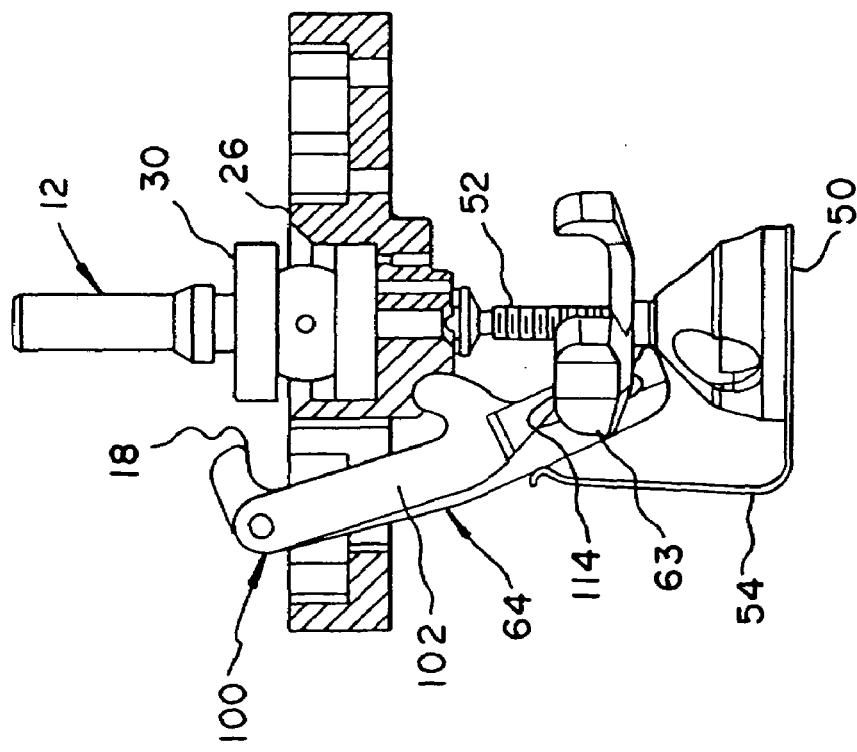

HIGH RELIABILITY PRECISION LATCH

FIELD OF THE INVENTION

This invention relates generally to actuated mechanical interlock mechanisms and, more particularly, to high reliability, high stability latching of deployable optical metering structures.

BACKGROUND OF THE INVENTION

To extend the range of astronomical telescopes, it is necessary to increase the effective aperture. This implies that larger diameter primary mirrors must be employed. The current state of the art has reached the practical size limit of monolithic mirrors. As a result, segmented primary mirrors that include multiple mirrored petals around a monolithic mirrored center segment have been devised. A space borne telescope employing segmented primary mirrors will require deployment once in orbit. Linear, stable, high stiffness precision latches, with high reliability values, should be used to interlock the metering structure, once the mirror is deployed, to maintain mirror performance. The probability of latch failure during system deployment has to be minimized to ensure mission success. Conventional latching technology, discussed in greater detail below, does not address the need for high stiffness, linearity, and precision in latches that are used for interlocking deployable space telescopes. Furthermore, latch technology, as used in satellite antennae, does not meet optical tolerance requirements. Satellite antennae latches often suffer from repeatability and stability problems that are typically two orders of magnitude below optical system requirements.

Conventional latching mechanisms are categorized either as a retaining type or a mating type latch mechanism. Retaining type latch mechanisms are preset in the latched position and released in their operating state. Examples of this type are illustrated in U.S. Pat. No. 4,682,804 issued Jul. 28, 1987 to William B. Palmer, et al., titled "Releasable Coupling Assembly and U.S. Pat. No. 4,508,296 issued Apr. 2, 1985 to Keith H. Clark, titled "Hemispherical Latching Apparatus." These retaining latch mechanisms are used to retain payloads during transport, preventing damage due to shock and vibration. Remote release of the latch allows the payload to be removed from the support structure. High reliability and preload are their key performance features; not linearity, stability, or high stiffness precision.

Mating latch mechanisms are illustrated in U.S. Pat. No. 4,431,333 issued Feb. 14, 1984 to Joseph A. Chandler, titled "Apparatus For Releasably Connecting First And Second Objects In Predetermined Space Relationship and U.S. Pat. No. 4,905,938 issued Mar. 6, 1990 to Matthew Braccio et al. These mating latch mechanisms have male couplings that mate with female sockets. Latching occurs after the halves are mated and serve to connect two bodies after contact. These are used to grapple satellites for repair or connection of trusses where only low tolerance alignment is necessary. Again, no consideration is given to linearity, stability, or high stiffness, repeatability and precision of the connection. Consequently, there exists a need for latching mechanisms that are linear, stable, repeatable, and have high stiffness and precision.

SUMMARY OF THE INVENTION

The aforementioned need is met according to the present invention by providing a reusable self-aligning precision latch, including a latch body for mounting a latch assembly, and an interface cone as described herein. A lead screw, coupled to the latch body on one end, pivots at an interface on the latch body allowing for self-alignment. A drive cam having a plurality of surfaces and positioned on the lead screw engages a plurality of linkage assemblies such that at least two links are driven. A flexured ball assembly clamped by the plurality of linkage assemblies to the latch body, with a pivoting clamp plate, such that all clamping forces between the pivoting clamp plate and the latch body are equalized. A motor for closing and opening the self-aligning precision latch by turning the lead screw to apply and release, respectively, the clamping forces between the pivoting clamp plate and the latch body.

Briefly stated, the foregoing and numerous other features, objects and advantages of the present invention will become readily apparent upon review of the detailed description, claims and drawings set forth herein. These features, objects and advantages are accomplished by providing a high stability, high reliability ball-in-cone type latch mechanism designed specifically for large deployable optical systems.

ADVANTAGEOUS EFFECT OF THE INVENTION

The present invention has the following advantages: a high stability, high reliability, ball-in-cone type latch mechanism designed specifically for large deployable optical systems. The latch mechanism according to the present invention is well suited for use in the deployment of a segmented primary mirror comprising a plurality of petals surrounding a monolithic center segment. Additionally, the present invention provides a precision latch mechanism that can be used to interlock the metering structure of a segmented mirror, once the mirror is deployed to thereby maintain mirror performance. The precision latch mechanism according to the present invention has high repeatability along with linearity, stability, high stiffness and precision as a latch mechanism.

BRIEF DESCRIPTION OF THE DRAWINGS

FIGS. 11a, 11b, 11c, 11d, and 11e are simplified elevational views of the latch and flexured ball assembly (showing only a single linkage assembly) illustrating the four basic kinematic stages of the latch operation.

To facilitate understanding, identical reference numerals have been used, where possible, to designate identical elements that are common to the figures.

DETAILED DESCRIPTION OF THE INVENTION

The present invention provides a nearly perfect kinematic mount between structural or optical elements and can easily be remotely controlled. Clamping force and drive position feedback can be incorporated to allow controlled closure and continuous force monitoring during and after clamping. A minimum number of moving parts maintains reliability at a value of 0.9994 or better. When in the closed position, the interface consists of a ball captured between two conical surfaces. A novel flexured ball and floating clamp plate is attached to the structure being deployed. The latch base is equipped with a conical seat to accept the ball, and three clamp fingers grip the floating clamp plate once the ball is seated in the socket. A lead screw driven axial cam serves to drive the clamping mechanism into both a clamped and a retracted position. A four bar linkage is formed by the latch cam, coupler link, follower link, and seat. Once the follower link is grounded on the seat, the coupler link acts as a simple lever applying force to the clamp plate. Advantage is taken of the relatively large motion available from a four bar mechanism, as well as the mechanical advantage of a simple lever, once latching is initiated. Large clamping forces generated at the interface by the coupler are reacted at the seat, thereby providing high interface stiffness and linearity. No latching forces are transferred to the optical support structure. High interface clamping forces on the order of thousands of pounds can be achieved with low input torque at the lead screw by choosing appropriate cam angles. Employing a flat cam area at the end of travel eliminates the need for accurate final cam position. Choosing appropriate materials can eliminate thermally induced force variation. End mounting the lead screw in the latch seat with a spherical bearing compensates for part tolerances and equalizes clamp finger force during latching. Lobes on the upper cam surface and lower follower links provide a positive closure in the event that retention springs fail or debris prevents the pawls from moving into position properly. A high level of reliability is obtained by minimizing the number of moving parts. Limit sensors at extremes of cam travel and strain gauges on clamp arms can be provided to monitor operation during the latching procedure.

Figure 1:
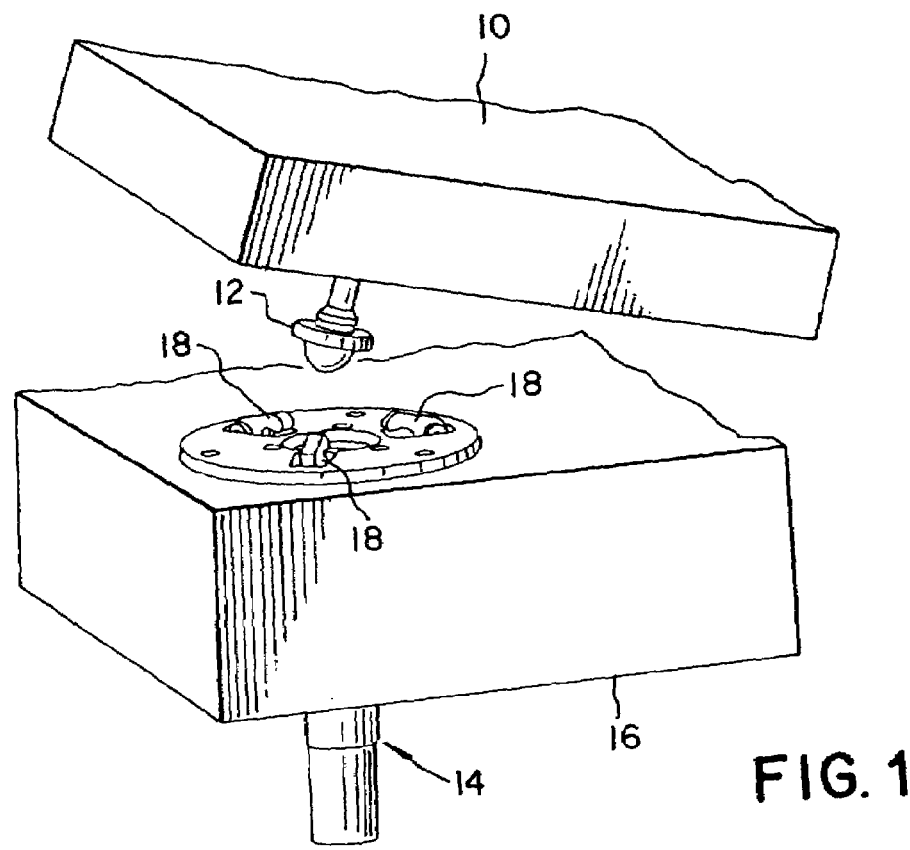
FIGS. 1, 2, and 3 are perspective illustrations of the latching sequence of the latch mechanism of the present invention in conjunction with an exemplary deployed member and an exemplary reference structure.
Figure 2:
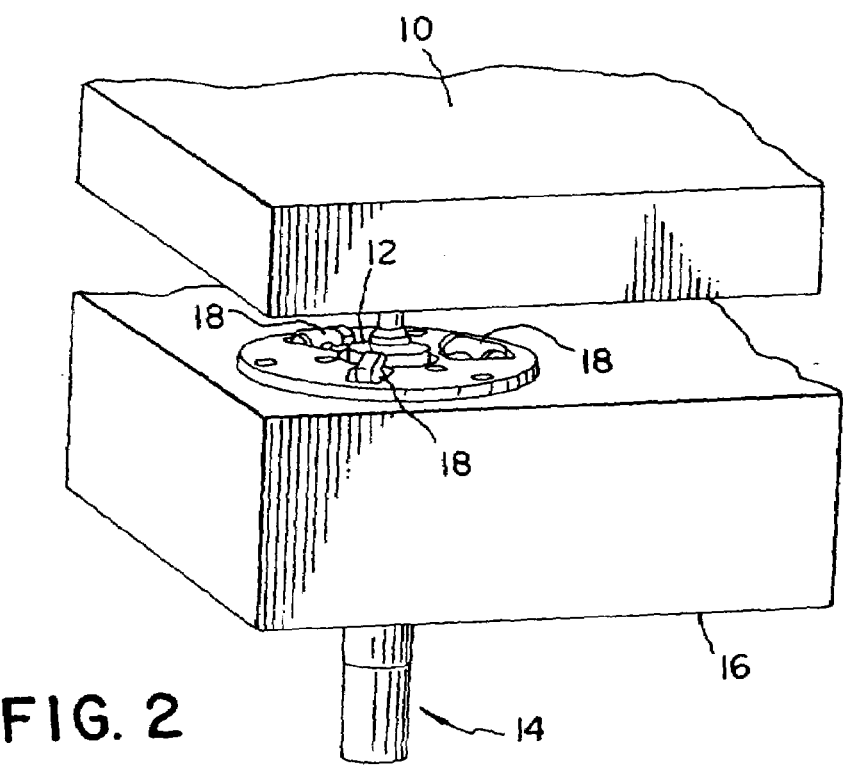
Figure 3:
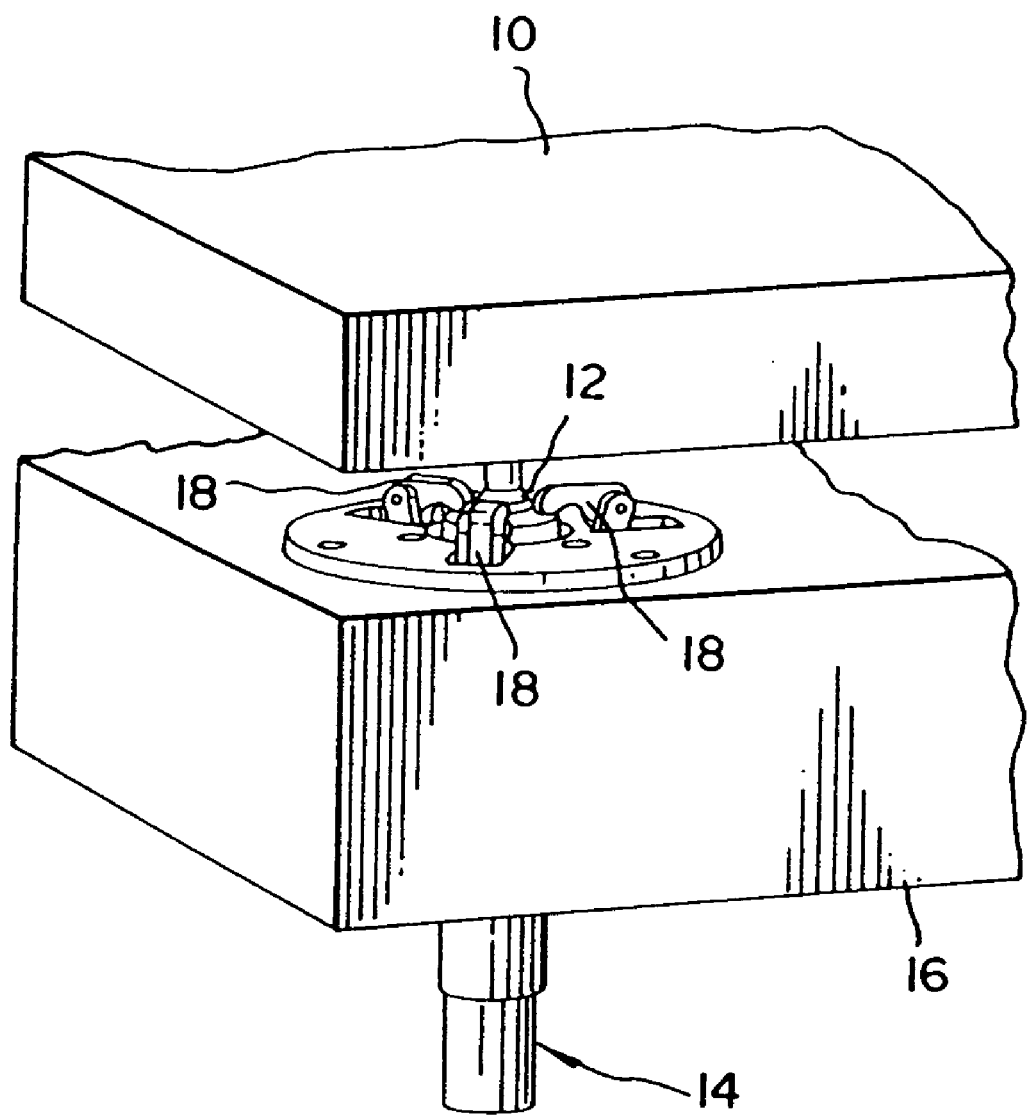

Referring to FIGS. 1 through 3, there are three distinct stages that occur during a deployment operation of a large optical system. A single corner of a typical deployed optical system is illustrated in FIGS. 1 through 3. During the first stage as illustrated in FIG. 1, the deployed member 10 has attached to it a flexured ball assembly 12. The flexured ball assembly 12 (shown in greater detail in FIGS. 4 and 8) is in alignment with a latch mechanism 14 (shown in greater detail in FIGS. 4 and 5) which is mounted in a reference structure 16. Any number of common methods can be used to maintain axial alignment. Latching pawls 18 are driven to their open position, providing clearance for the approaching flexured ball assembly 12. As deployment proceeds, the flexured ball assembly 12, makes contact with the latch mechanism 14 as shown in FIG. 2. Position sensing of the deployed member 10 is generally provided by an external system (not shown), and indicates when the flexured ball assembly 12 is in its mated position with latch mechanism 14. At this point the latch mechanism 14 is actuated, which causes the latching pawls 18 to engage the flexured ball assembly 12, as illustrated in FIG. 3. Applying a large force, typically about 1000 pounds, to seat the ball assembly 12, completes the latching operation.

Figure 4:
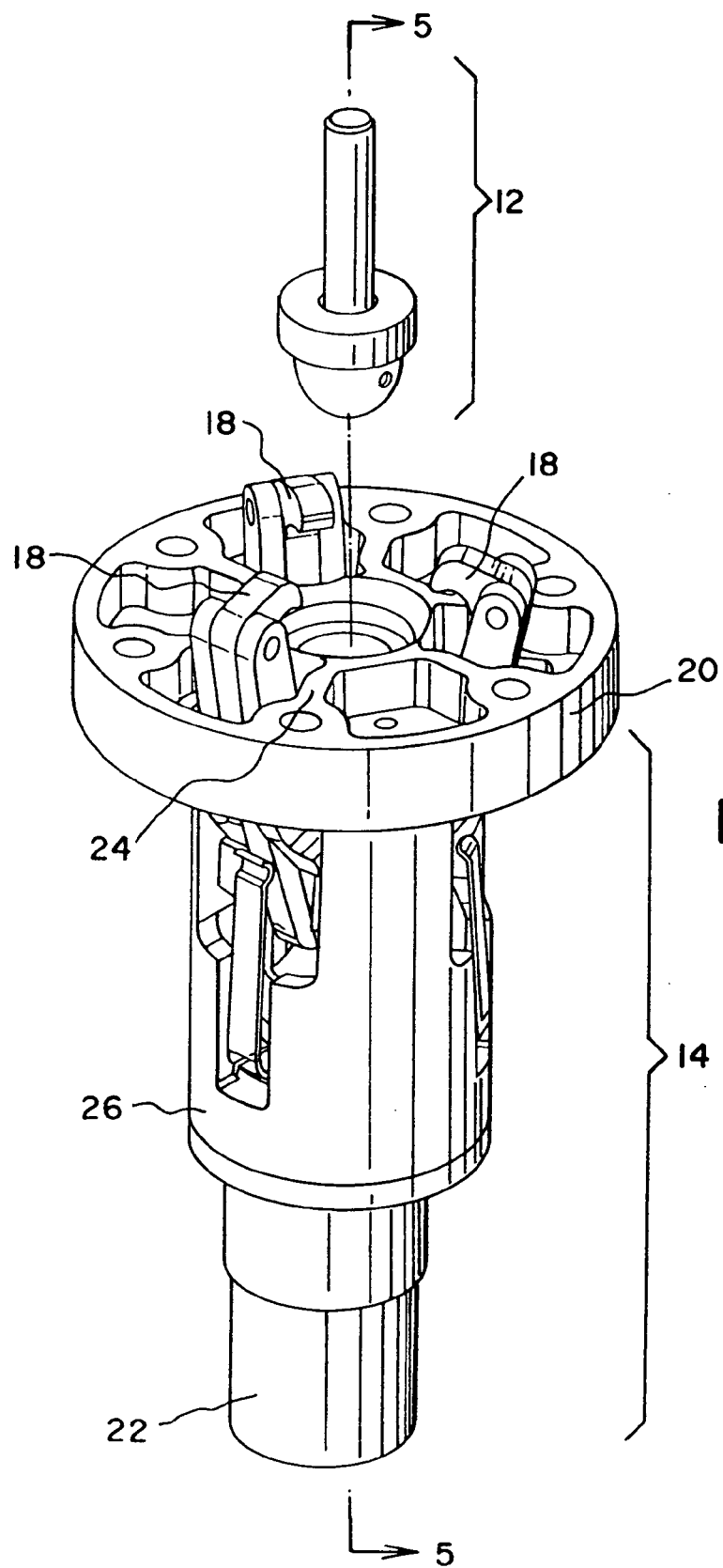
FIG. 4 is a perspective view of the latch and flexured ball assembly removed from the exemplary deployed member and the exemplary reference structure shown in FIGS. 1 through 3.

Turning to FIG. 4, a more detailed view is shown of the latch 14 and flexured ball assembly 12 removed from their respective structures 10 and 16. Mounting plate 20 serves as the interface between the latch 14 and the reference structure 16 to which it is mounted. Drive motor 22 moves the latching pawls 18 in and out and supplies clamping force when the latching pawls 18 are in the latched state. The latch mechanism 14 is capable of locking the latching pawls 18 tightly in an open position as well as applying a large clamping force when the latching pawls 18 are in the fully latched position. The latching pawls 18 are supported within a latch body 24 to which mounting plate 20 is integral.

Figure 5:
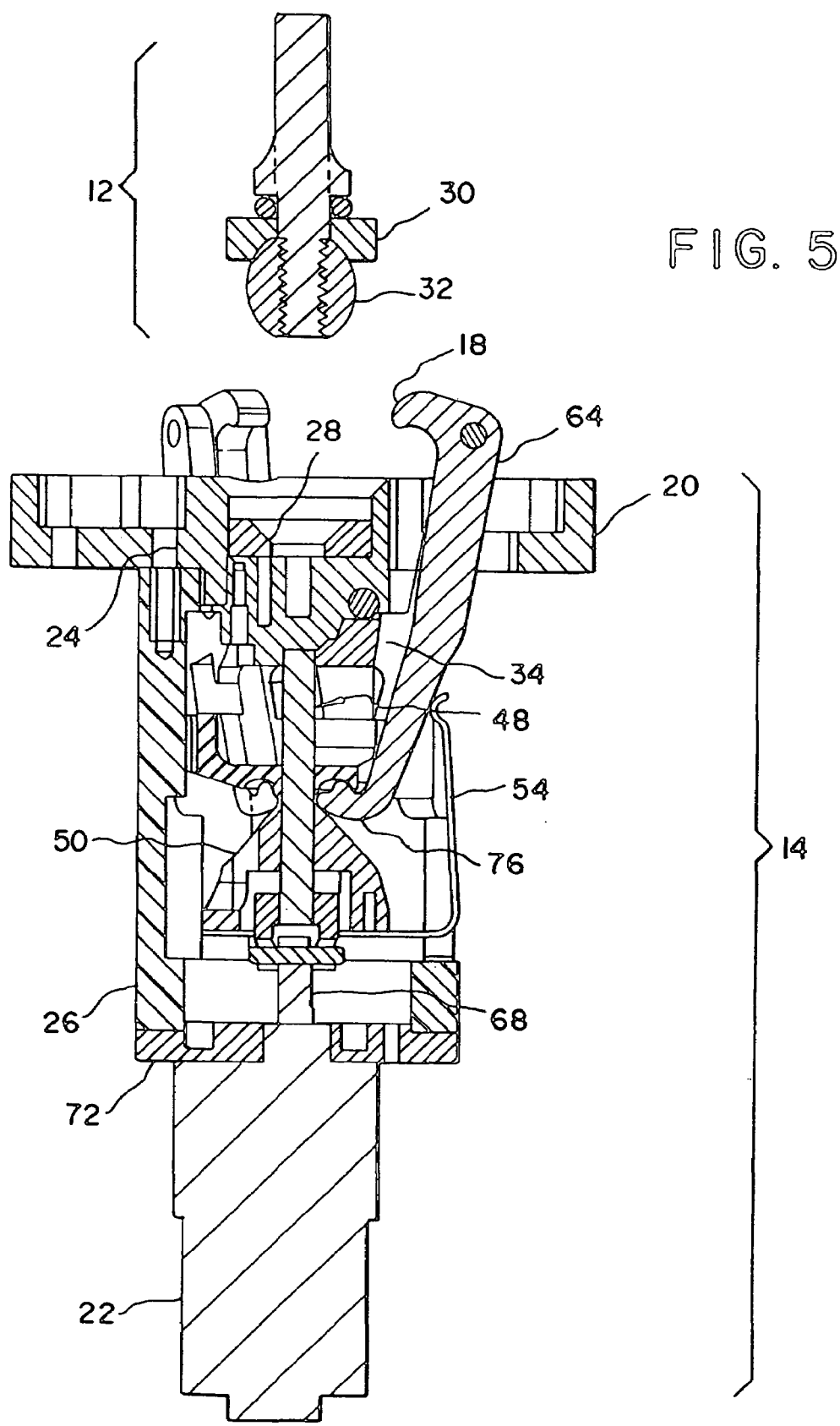
FIG. 5 is a cross-sectional view of the latch mechanism and flexured ball assembly taken along line 5—5 of FIG. 4.
Figure 6:
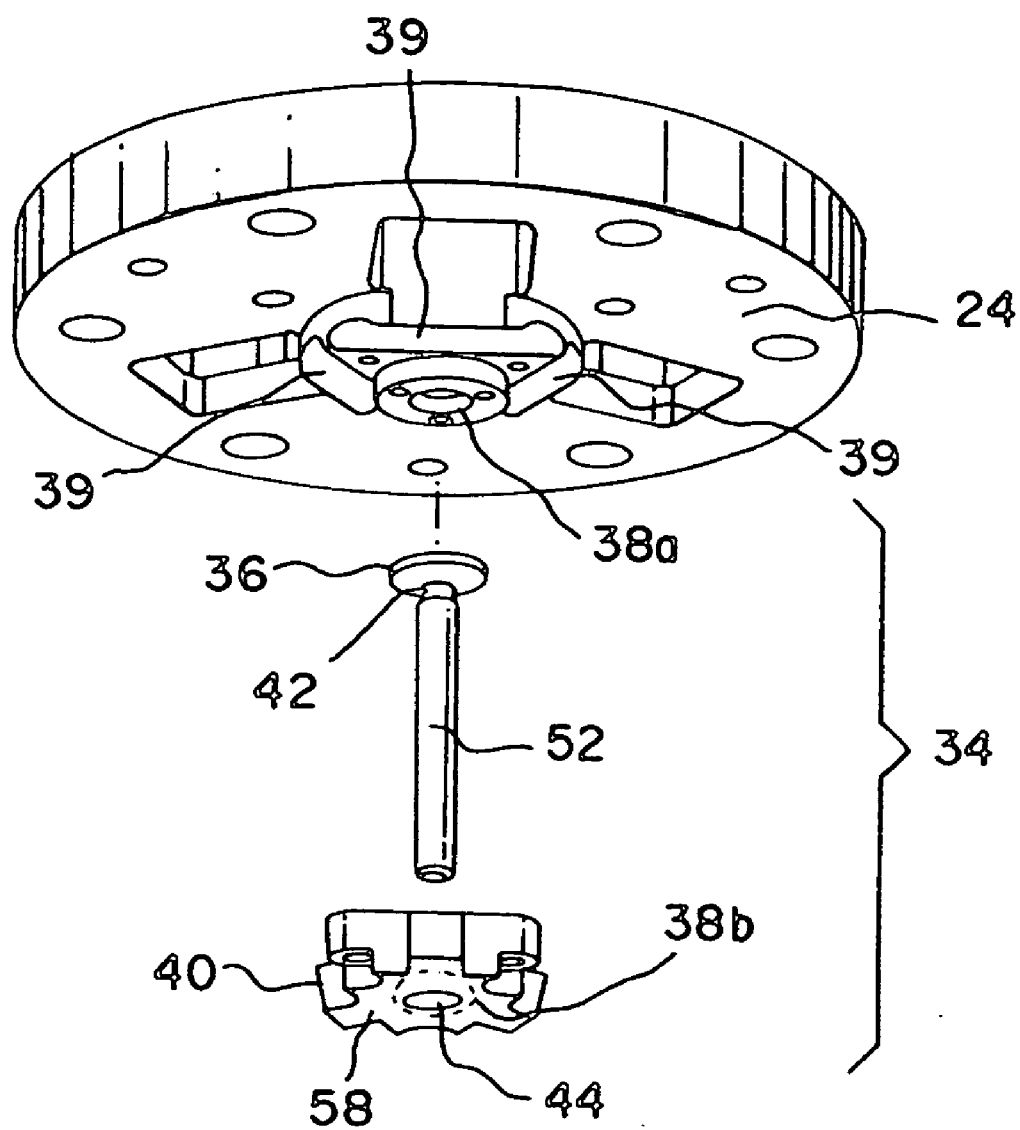
FIG. 6 is an exploded perspective view of the spherical bearing assembly.

Referring next to FIG. 5, there is shown a cross-sectional view of the latch mechanism 14 and flexured ball assembly 12 taken along line 5—5 of FIG. 4. The center portion of latch body 24 provides the clamping force reaction structure as well as the lead screw spherical bearing seat 38a (as shown in FIG. 6). The joint stiffness relative to the structure is controlled by the interface stiffness of mounting plate 20. The actual latch stiffness is controlled by the interface characteristics of the ball seat 28, clamp plate 30, and ball 32. Consequently, the latch mechanism 14 and flexured ball assembly 12 are generally made of a hard material. Although the ball seat 28 is shown as an insert in the latch body 24, those skilled in the art will conclude that the ball seat 28 may be integral to the latch body 24.

Still referring to FIG. 5 and also FIG. 6, there is a spherical bearing assembly 34 attached to the latch body 24. The spherical bearing assembly 34 is comprised of a spherical bearing 36, bearing seat 38a centrally located on the bottom of latch body 24, and bearing cup 38b on bearing housing 40. The geometry of bearing seat 38a and bearing cup 38b is such that when bearing housing 40 is mounted on the base of the latch body 24 (see FIG. 6), bearing seat 38a and bearing cup 38b provide a running fit with the spherical bearing 36. Ball stem 42, which is integral to lead screw 52, extends through an axial bore 44 in the bearing housing 40. The axial bore 44 is sized to clear the lead screw threads and allow up to 18° of tilt on the ball stem 42 in any direction. Material selection for bearing seat 38a (integral to latch body 24) and bearing cup 38b (integral to bearing housing 40) are typically hardened 440c stainless steel and must be different for the material for spherical bearing 36 (typically hardened M6 tool steel) to prevent micro welding at the contact area, which can occur if the lubricant migrates. Solid lubricants or low friction coatings may also be used on the contacting surfaces.

Figure 7:
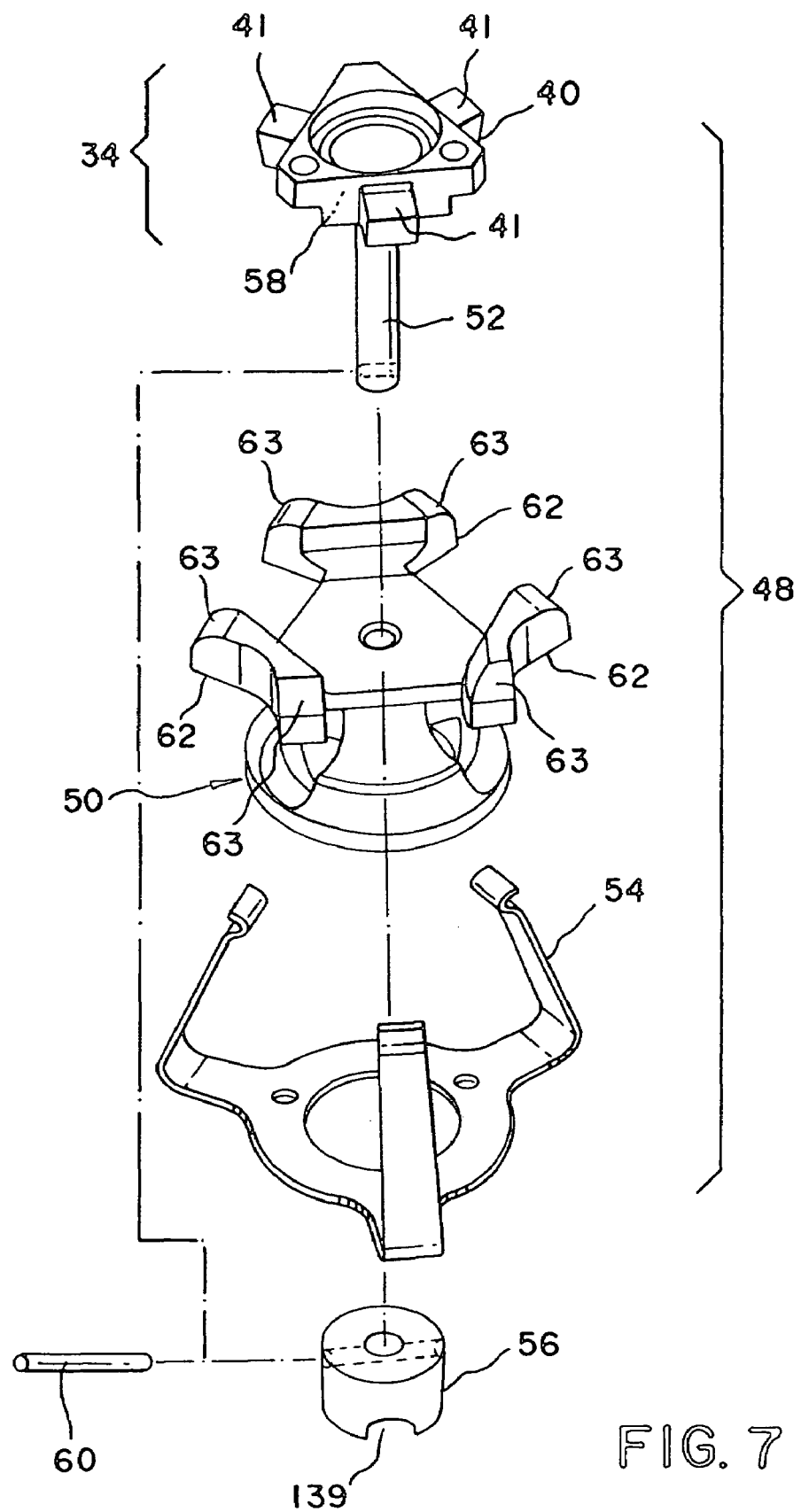
FIG. 7 is an exploded perspective view of the lead screw/cam assembly.

Referring to FIG. 7, the lead screw/cam assembly 48 is comprised of drive cam 50, lead screw 52, having a drive slot 139, spring element 54, motor coupling 56, and motor coupling pin 60. The drive cam 50 is preferably a hardened 440c stainless steel (or material dissimilar to the lead screw 52) and is threaded to mate with the lead screw 52 which is preferably made of hardened M6 tool steel. A fine pitch thread, typically ¼–80, is employed to provide great mechanical advantage and axial load bearing capabilities. Those skilled in the art will recognize the possibility of employing other thread types such as Acme geometry or a ball screw based on available motor torque, link geometry, and required clamping force. Optimization methods for these mechanisms are well known in the art. For wet lubricated interfaces red brass, beryllium copper, or titanium is employed for the drive cam 50. Similar materials for the drive cam 50 and coupler links 64 (shown in FIG. 5) may be employed if low friction coatings are applied to mating surfaces. Motor coupling 56 is internally threaded to match the thread of lead screw 52. Motor coupling 56 is positioned on the lower end of lead screw 52 to serve as a limit or travel stop for drive cam 50 when the latch is in the full open state. Once properly located, motor coupling 56 is pinned in place to prevent rotational and axial movement when contacted by the lower surface of drive cam 50. The lower surface 58 of the bearing housing 40 serves as an upper limit or travel stop for drive cam 50. Motor coupling pin 60 serves to lock motor coupling 56 in place on lead screw 52. The drive cam 50 is kept from rotating as the lead screw 52 turns via three anti-rotation flanges 62 that engage the latch housing 26 (shown in FIG. 5). The latch housing 26 should be made be made from a material dissimilar to drive cam 50 (typically aluminum or magnesium alloy), or a low friction surface treatment may be employed.

Still referring to FIG. 7 and also FIG. 5, lead screw 52 extends through drive cam 50. The bottom of the lead screw 52, to which is attached motor coupling 56 via drive slot 139, interfaces with or is otherwise coupled to the drive shaft 68 of drive motor 22 (both are shown in FIG. 5). Drive motor 22 (shown in FIG. 5) is supported from motor mount 72 (shown in FIG. 5) which is attached to the latch housing 26. An inward radial force is applied to the coupler links 64 (shown in FIG. 5) by a spring element 54, which is mounted on the lower surface of drive cam 50. The latch housing 26 also serves as an anti-rotation surface for the drive cam 50 and as a mounting surface for the motor mount 72. Lead screw/cam assembly 48 resides inside of latch housing 26 and is integral to the spherical bearing assembly 34. Drive cam 50 engages the actuating arms 76 of coupler links 64 to operate the latch (both are shown in FIG. 5).

Figure 8:
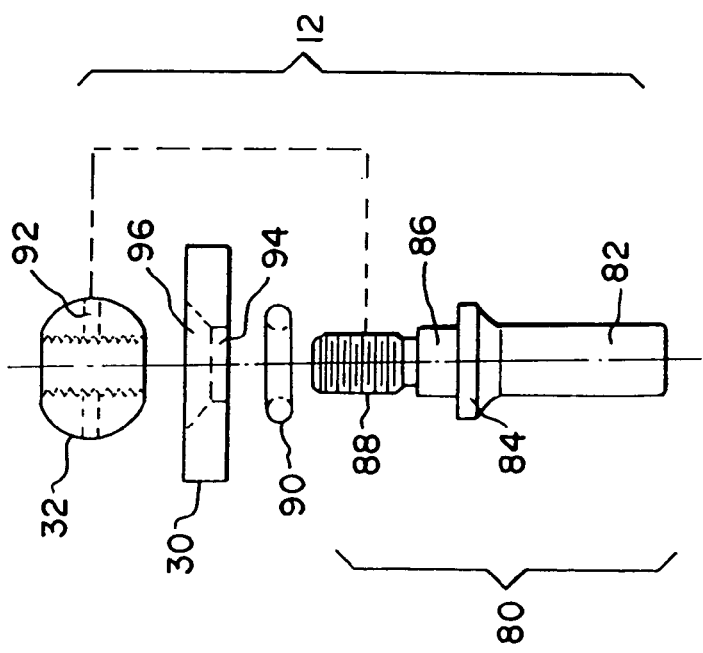
FIG. 8 is an exploded perspective view of the flexured ball assembly.

An exploded view of the flexured ball assembly 12 is shown in FIG. 8. The flexured ball assembly 12 comprises a flexured stem 80 including a cylindrical mounting shaft 82, a clamp plate retaining flange 84, a clamp plate centering shoulder 86, and a threaded shank 88. The cylindrical mounting shaft 82 is typically mounted in an interface block attached to a bipod flexure pair (not shown). Three such bipod flexure pairs constitute an arrangement well known in the art as a kinematic mount. Compliant member 90 is placed on threaded shank 88 and moved down until it meets the clamp plate retaining flange 84. Clamp plate 30 is placed on the threaded shank 88 and also moved down to meet compliant member 90. Ball 32 is then threaded onto threaded shank 88 and is tightened against clamp plate centering shoulder 86. A diametrically located hole 92 is provided in ball 32 to allow the ball 32 to be pinned by drilling a hole through the threaded shank 88 after assembly. The geometry of the clamp plate centering shoulder 86, clamp plate inner bore 94, clamp plate conical surface 96, and ball 32, is such that compliant member 90 is only slightly compressed, keeping the clamp plate 30 perpendicular to the axis of flexured stem 80, and clamp plate conical surface 96 in contact with the ball 32. Clamp plate inner bore 94 is slightly larger than clamp plate centering shoulder 86 allowing the clamp plate 30 to tip about the axis with only a slight force on the edge of the clamp plate 30. This "floating clamp" feature prevents locking in strains due to deployment mechanism misalignment or part dimensional variations in the latch. Ball 32 and clamp plate 30 are preferably made from hardened 440c stainless steel, since they define the clamped interface stiffness. Flexured stem 80 can be of any metal although a 400 series stainless steel is preferred. It is obvious to those skilled in the art that selection of low thermal expansion material may be employed to enhance dimensional stability.

Figure 9:
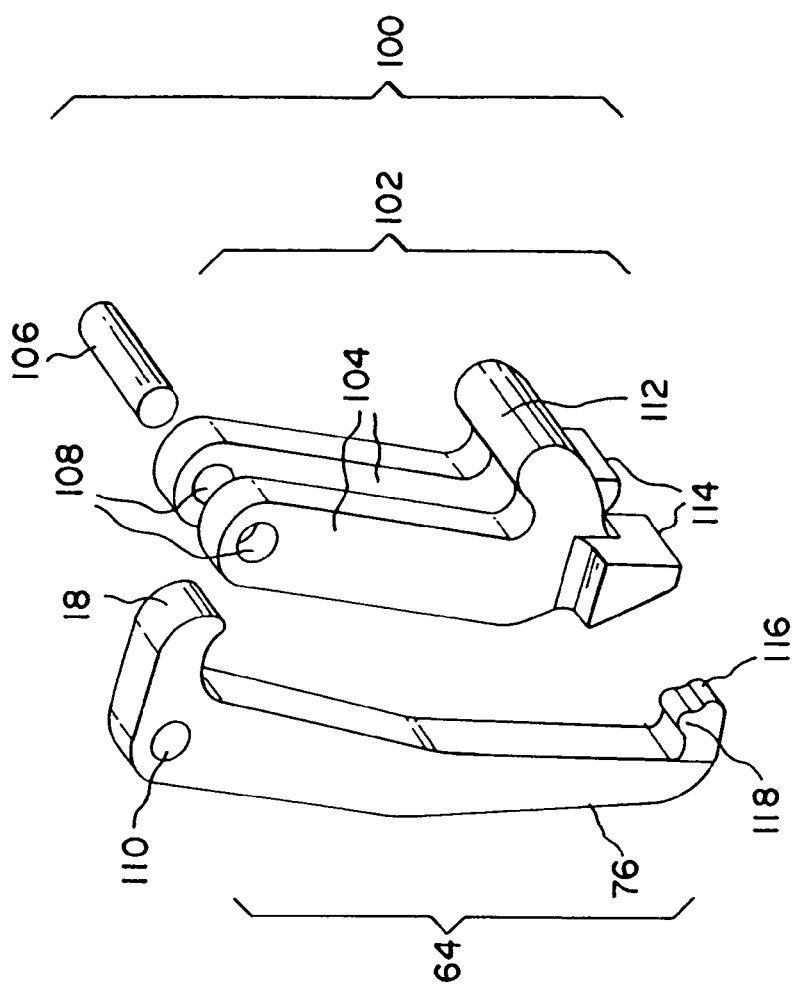
FIG. 9 is an exploded perspective view of the linkage assembly.

Each coupler link 64 (shown in FIG. 5) is part of a linkage assembly 100 as shown in an exploded view in FIG. 9. Each linkage assembly 100 is comprised of a coupler link 64, follower link 102, and upper pivot pin 106. Upper pivot pin 106 inserts through bores 108 in follower link 102 and pivot bore 110 in coupler link 64. Bores 108 in follower link 102 are sized to allow a press fit of upper pivot pin 106. Bore 110 in the coupler link 64 is sized as a running fit with upper pivot pin 106. All surfaces of coupler link 64 are treated with low friction coatings to maintain with low interface friction. High stresses in follower link arm 104 and coupler link 64 in the regions of the bores 108 and 110 require these to be made of a high tensile strength material such as hardened 440c stainless steel. Similarly, the pivot pin 106 is precision ground hardened tool steel. Pivot bar 112 maintains alignment of the follower link arms 104 during assembly and provides a pivot surface fitting in circular groves 39 (shown in FIG. 6) in the latch body 24. Mating circular groves 41 (shown in FIG. 7) on the bearing housing 40 capture the pivot bar 112 when mounted to the latch body 24. Each coupler link 64 has a latching pawl 18 that applies force to the clamp plate 30 (shown in FIG. 8). When follower links 102 are grounded via nubs 114 on secondary cam 63, (shown in FIG. 7), each coupler link 64 forms a simple lever, where the lever arms are defined as the distance from the center of the pivot bore 10 to the end of the respective latching pawl 18, and from the center of the pivot bore 110 to the cam follower 116 at the ends of actuating arms 76. Tab 118 is provided to allow the coupler links 64 to be drawn into the open position. Tapering of each coupler link 64 provides a sliding surface for residence of spring element 54, (shown in FIG. 7), and allows the bending stiffness of the coupler link 64 to be controlled. The bending stiffness of coupler link 64 and the amount of deflection produced by drive cam 50 (also, shown in FIG. 7) controls the force applied to the clamp plate 30. Spring element 54 (shown in FIG. 7) maintains contact of the coupler link 64 with the drive cam 50 throughout operation. Follower link 102 is equipped with nubs 114 that are engaged by the drive cam secondary surfaces 63 (shown in FIG. 7) to insure positive positioning of the follower link 102.

Figure 10:
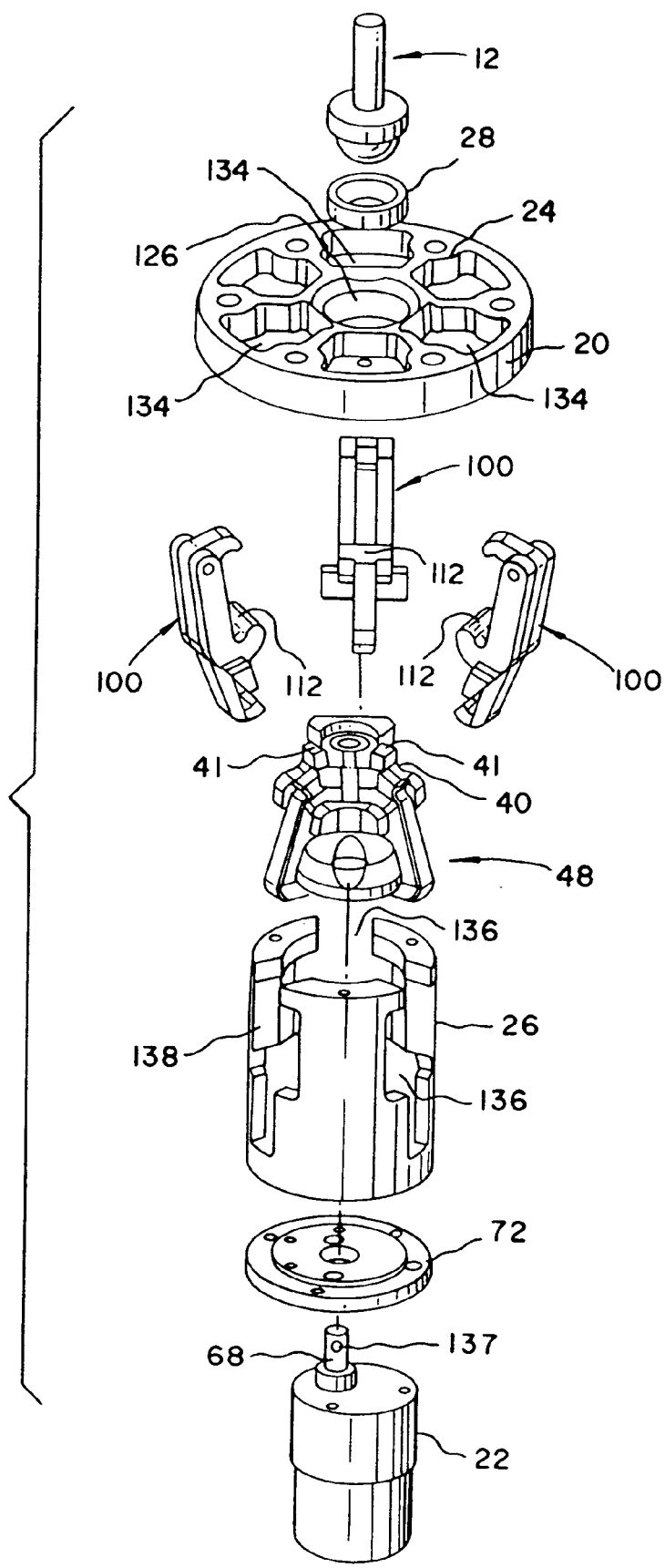
FIG. 10 is an exploded perspective view of the latch and flexured ball assembly of FIG. 4.

An exploded view of the complete latch of the present invention is shown in FIG. 10 to illustrate the final assembly procedure. Internal subassemblies including the linkage assemblies 100, lead screw/cam assembly 48, and ball seat 28 are assembled onto the latch body 24. Linkage assemblies 100 are pushed into upper clearance slots 134 in the mounting plate 20 until the pivot bars 112 can seat in the circular grooves 39 (shown in FIG. 6) on the latch body 24. Pivot bars 112 on follower link 102 (shown in FIG. 9) are positioned in circular grooves 39 of the latch body 24. Lead screw/cam assembly 48 is then mounted to the latch body 24 via the bearing housing 40, capturing the three pivot bars 112 between circular grooves 39 and 41. This creates a running fit between pivot bars 112 and circular grooves 39 and 41. Ball seat 28 (shown in FIG. 5) is also press fit into the axial bore 126 of latch body 24. Clearance holes in the bearing housing 40 allow the lead screw/cam assembly 48 to be mounted to the bottom of the latch body 24 with screws. The assembled mechanism comprising the latch body 24 and ball seat 28, linkage assemblies 100, and lead screw/cam assembly 48, is then inserted into latch housing 26. Upper clearance slots 134 in the mounting plate 20 allow free movement of the linkage assemblies 100. As the lead screw/cam assembly 48 is moved into place on latch body 24 coupler links 64 (shown in FIG. 9) are interposed between the drive cam 50 surfaces and the spring element 54 (both are shown in FIG. 7). Spring element 54 is placed therein to apply an inward radially directed force to the backs of coupler links 64. Lower clearance slots 136 in the latch housing 26 allow the lead screw/cam assembly 48 to pivot radially about the spherical bearing 36 (shown in FIG. 6) to accommodate mechanical misalignments during latching. The sides of lower clearance slots 136 provide a reaction surface for the anti-rotation flanges 62 (shown in FIG. 7). Motor mount 72 spaces the drive shaft 68 from the end of lead screw 52 (shown in FIG. 7). Preferably, a drive pin 137 extending from drive shaft 68 fits loosely into a drive slot 139 in the lead screw 52 (both are shown in FIG. 7) to allow angular motion at the spherical bearing 36 (shown in FIG. 6). The entire clamping mechanism is allowed to float within the latch housing 26, allowing clamping to occur even if debris enters the system.

Figure 11C:
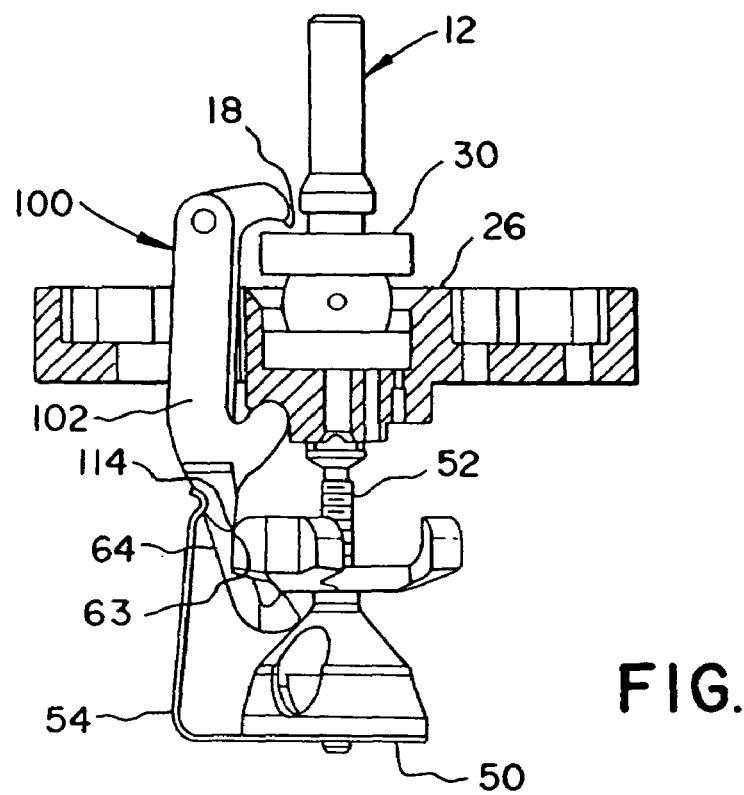

To better understand the functions of the individual latch parts, it is necessary to understand the basic kinematic stages of the latching operation. These are illustrated schematically in FIGS. 11a, b, c, d, and e, by showing only one linkage assembly 100 on the latch housing 26. It is assumed the flexured ball assembly 12 is seated in the latch housing 26 when the latching operation begins. The first stage, illustrated in FIG. 11a, shows latching pawl 18 in its widest position allowing clamp plate 30 of the flexured ball assembly 12 to easily move into the latch. Drive cam 50 on the lead screw 52 pulls the coupler link 64 into its lowest position. Contact between the drive cam 50 and coupler link 64 is maintained by the radially inward force from spring element 54. A four bar linkage is formed by the drive cam 50, lead screw 52, coupler link 64, and follower link 102 in this stage. At the second stage, shown in FIG. 11b, drive cam 50 has moved up on lead screw 52 toward the latch housing 26 to a point where nubs 114 almost contact secondary cam surface 63. Further upward motion of the drive cam 50 initiates contact of the secondary cam 63 with the nubs 114 on follower link 102. Even further upward motion forces follower link 102 into the position illustrated in FIG. 11c. At this third stage, drive cam 50 has moved further up on lead screw 52 toward the latch housing 26 allowing nubs 114 to move down the curved surface of secondary cam 63, preventing the follower link 102 from moving back to a previous position. At this point the clamp plate 30 is considered captured. Although no force is being applied, the flexured ball assembly 12 cannot move out of the capture range of the latch. Grounding of the follower link 102 on secondary cam 63 via the nubs 114 degenerates the four bar linkage into a simple lever that is activated in the final latching stage by the drive cam 50.

Figure 11D:
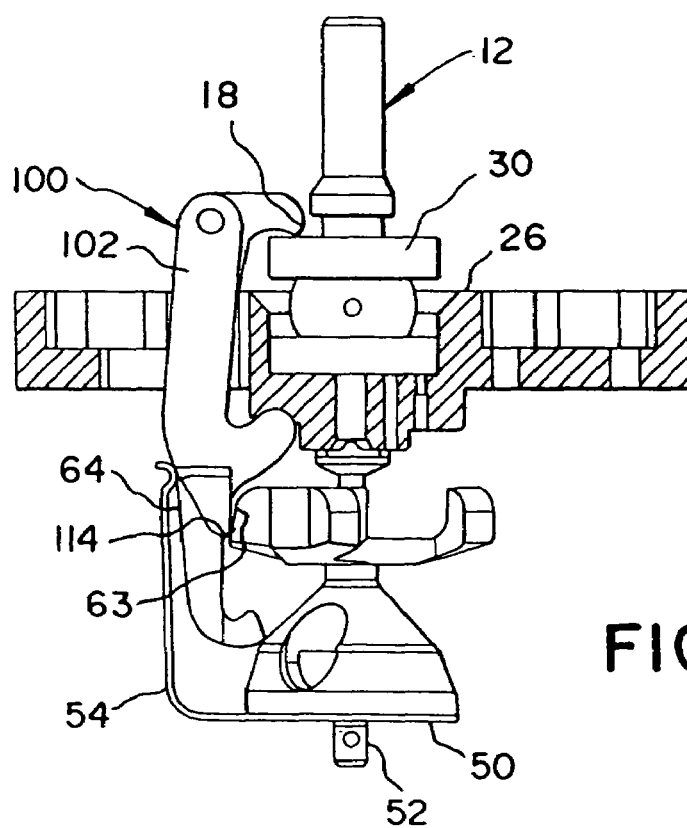
Figure 11E:
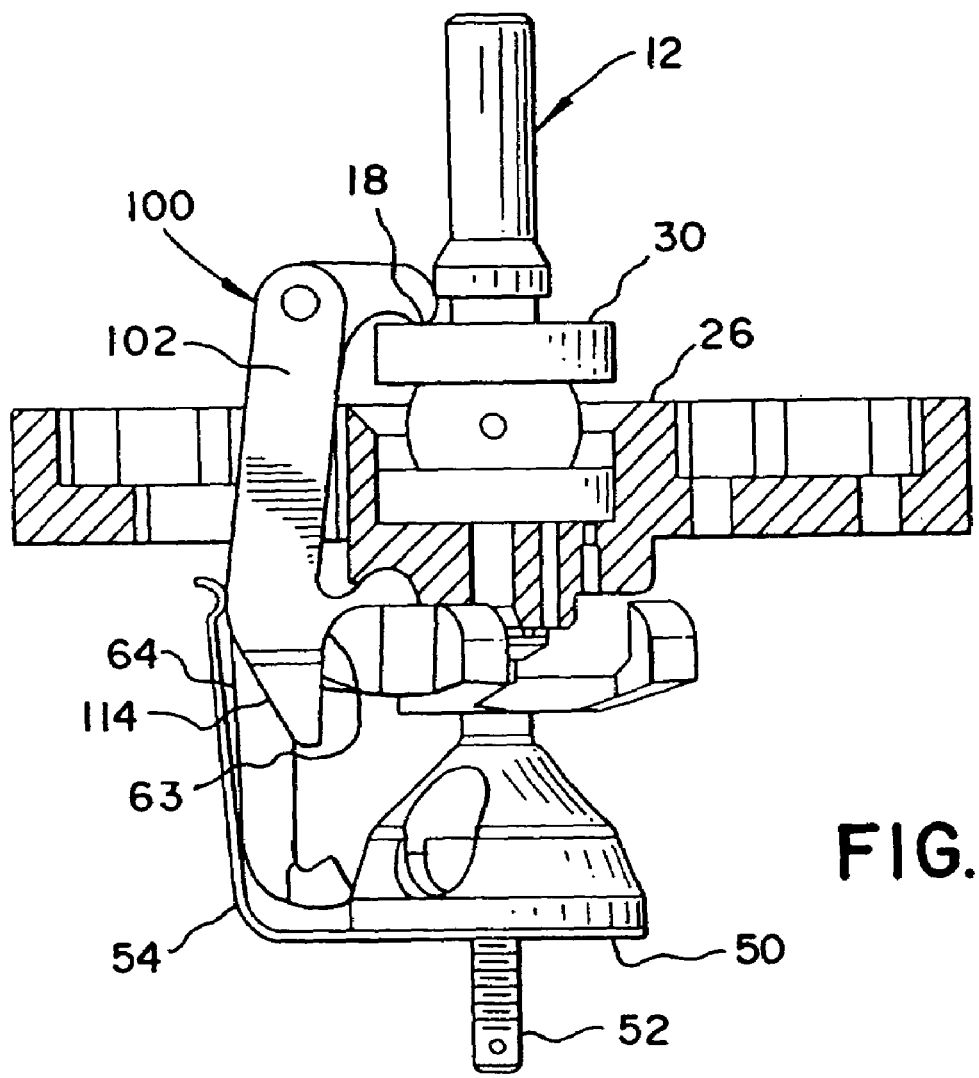

The end of the fourth stage of the latching process is illustrated in FIGS. 11d and 11e. Here, the drive cam 50 has moved nearly to its final position on the lead screw 52. Movement of the coupler link 64 along the drive cam 50 initiates contact of latching pawl 18 with the clamp ring 30 and applies the full clamping force. In the final clamped position, illustrated in FIG. 11e, the cam 50 has moved to its final position on lead screw 52 and a full clamping force is applied.

Figure 12A:
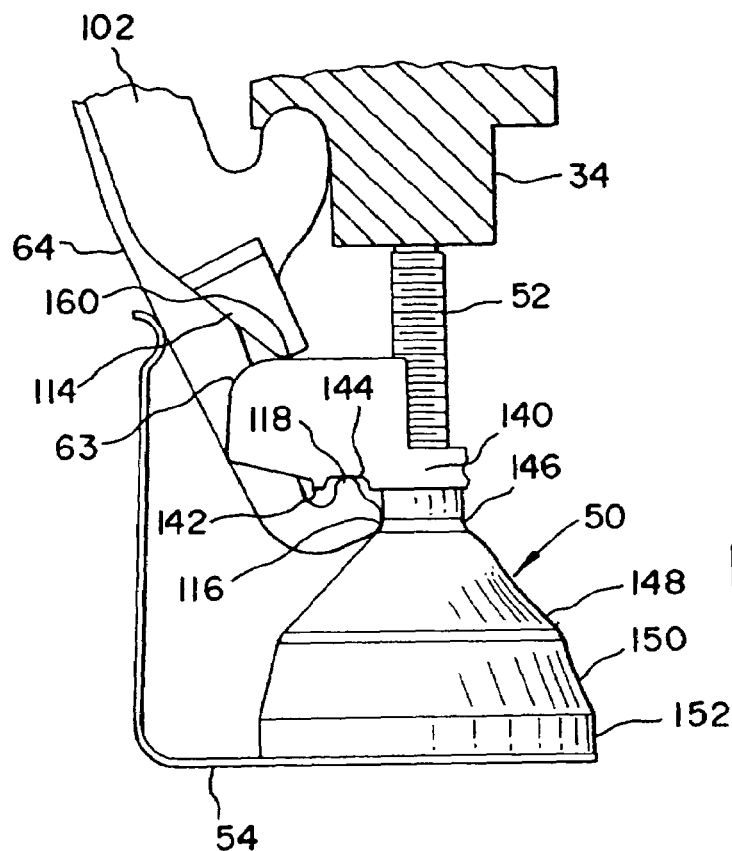
FIGS. 12a, 12b, 12c, 12d, 12e, and 12f are simplified side elevational views of the lead screw/cam assembly in combination with a single coupler link illustrating cam/follower relationship for the six phases of the latching operation.
Figure 12B:
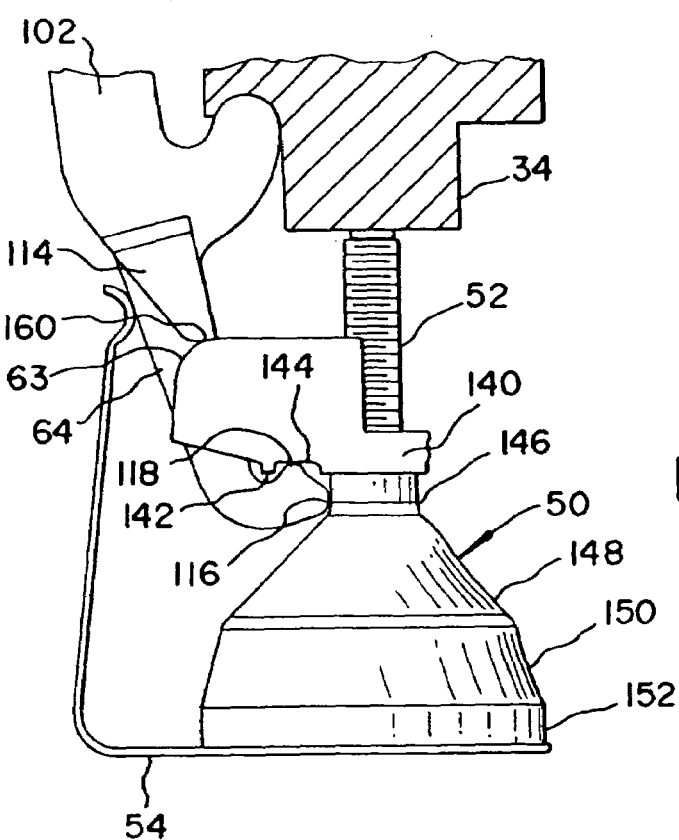

Drive cam 50 is designed to have six distinct operating regions as illustrated in FIGS. 12a, b, c, d, e, and f. The first state is shown schematically in FIG. 12a where coupler link 64 and follower link 102 are fully retracted, putting the latch in its open position. The top of drive cam 50 is equipped with a flange 140 having a lip 142 that prevents tab 118 from leaving upper cam surface 144 as it is pulled down by lead screw 52. Spherical bearing assembly 34 reacts to an initial upward force from the lead screw 52, while spring element 54 applies a radially directed force on coupler link 64. It is not necessary for cam follower 116 to be in contact with the surface of drive cam 50. Secondary cam follower 160 at the end of nub 114 contacts the top portion of secondary cam surface 63. In the event that spring element 54 does not have enough force to push follower link 102 and coupler link 64 into position, for example, if debris is in the interface, secondary cam surface 63 of cam 50 can force them into position. The second state is shown schematically in FIG. 12b; where drive cam 50 has slightly moved up on the lead screw 52 to a point where tab 118 is still in contact with upper cam surface 144, but has moved in radially from lip 142 to allow cam follower 116 to make positive contact with cylindrical surface 146 on drive cam 50. Contact between coupler link 64 and cylindrical surface 146 is maintained by spring element 54 and contact between the secondary cam surface 63 and the secondary cam follower 160. A slight downward force is applied to the spherical bearing assembly 34 by lead screw 52.

Figure 12C:
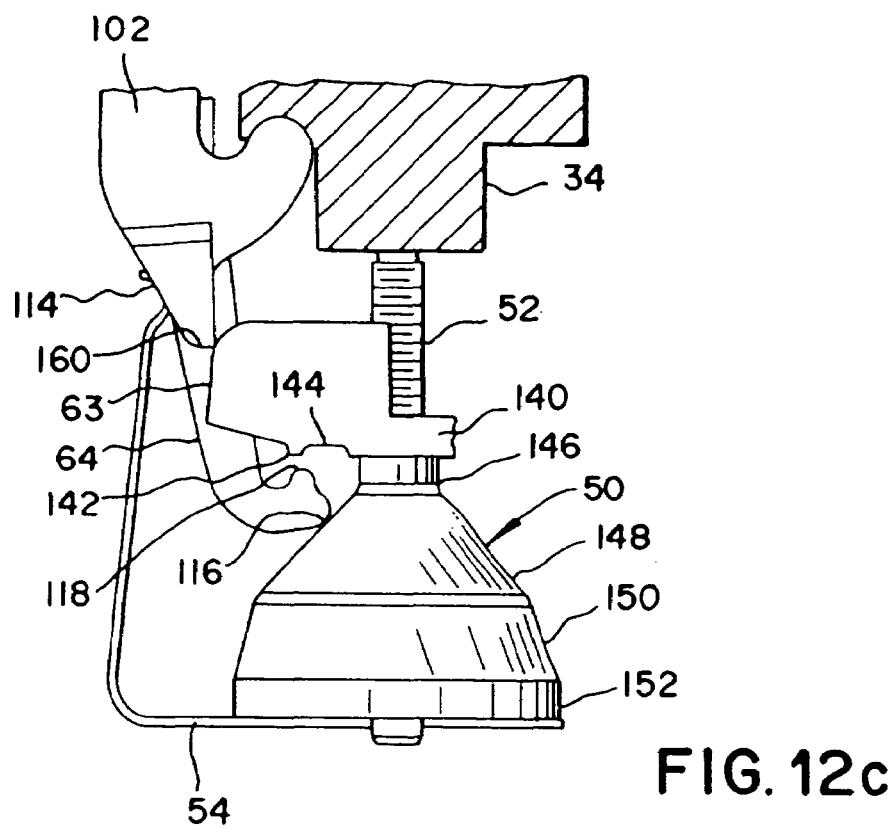

The third state is shown schematically in FIG. 12c; where drive cam 50 has moved up further along lead screw 52. Cam follower 116 has moved from the cylindrical surface 146 to the steep tapered surface 148 on drive cam 50, while tab 118 is no longer in contact with any surface. Spherical bearing 34 reacts only to a light upward force and spring element 54 maintains a radially directed force on coupler link 64. Latching pawl 18 (shown in FIGS. 11a–14e) closes on the clamp plate 30 (shown in FIGS. 11a–11e) during this stage. When cam follower 116 reaches the end of the steep tapered surface 148, the latching pawl 18 is in contact with the clamp plate 30. Secondary cam follower 160 has moved down the secondary cam surface 63. The four bar linkage degenerates into a simple lever at this stage since the follower link 102 is grounded to the secondary cam 63 via the nubs 114 of follower link 102.

Figure 12D:
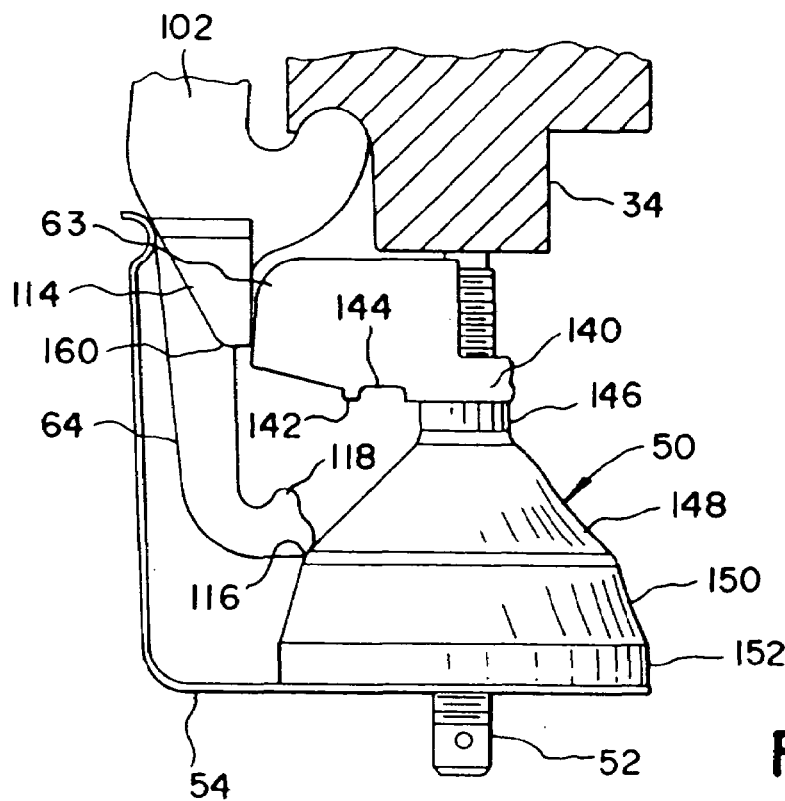

The fourth state is shown schematically in FIG. 12d; where drive cam 50 has moved further up along lead screw 52. Cam follower 116 has moved to the end of the steep tapered surface 148 on drive cam 50. Secondary cam follower 160 is now contacting the side of secondary cam surface 63 preventing follower link 102 from releasing clamp plate 30 (shown in FIGS. 11a–11e) even if a dislodging force is encountered on any of the three pawls. Spherical bearing assembly 34 still reacts only to a light upward force and spring element 54 is no longer needed to keep follower link 102 and coupler link 64 in position.

Figure 12E:
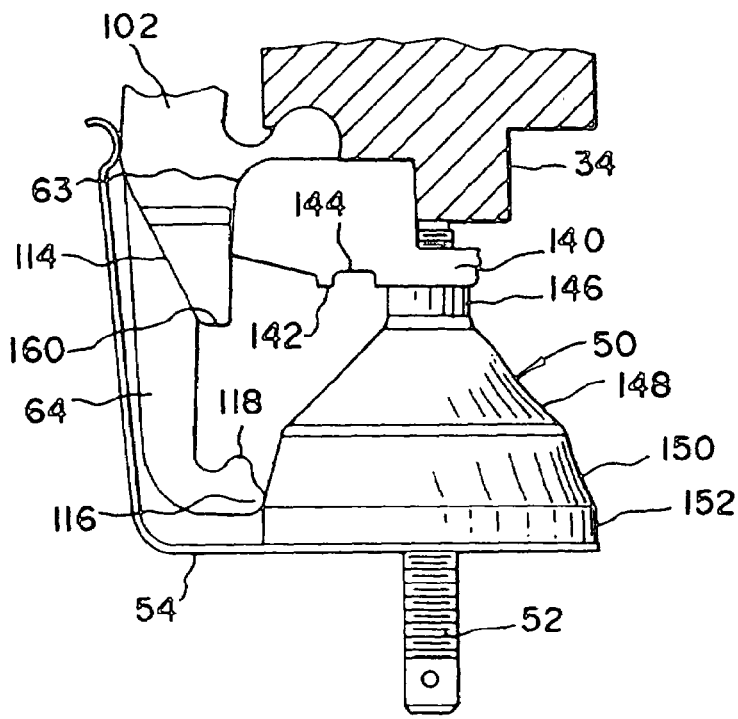

The fifth state is shown schematically in FIG. 12e; where drive cam 50 has moved further up along lead screw 52 almost to its final position. Cam follower 116 has moved from the steep tapered surface 148 to a shallow tapered surface 150 on drive cam 50. Displacement due to drive cam's 50 motion bends the coupler link 64 applying a high load on the clamp ring 30 (not shown). Spherical bearing 34 assembly reacts to a high downward force substantially greater than spring element 54. When cam follower 116 reaches the end of the shallow tapered surface 150 the latching pawls 18 (shown in FIGS. 11a–11e) generate the maximum force on clamp plate 30. Use of a shallow taper gives a large mechanical advantage while clamping, thereby reducing the required motor torque for a desired clamping force.

Figure 12F:
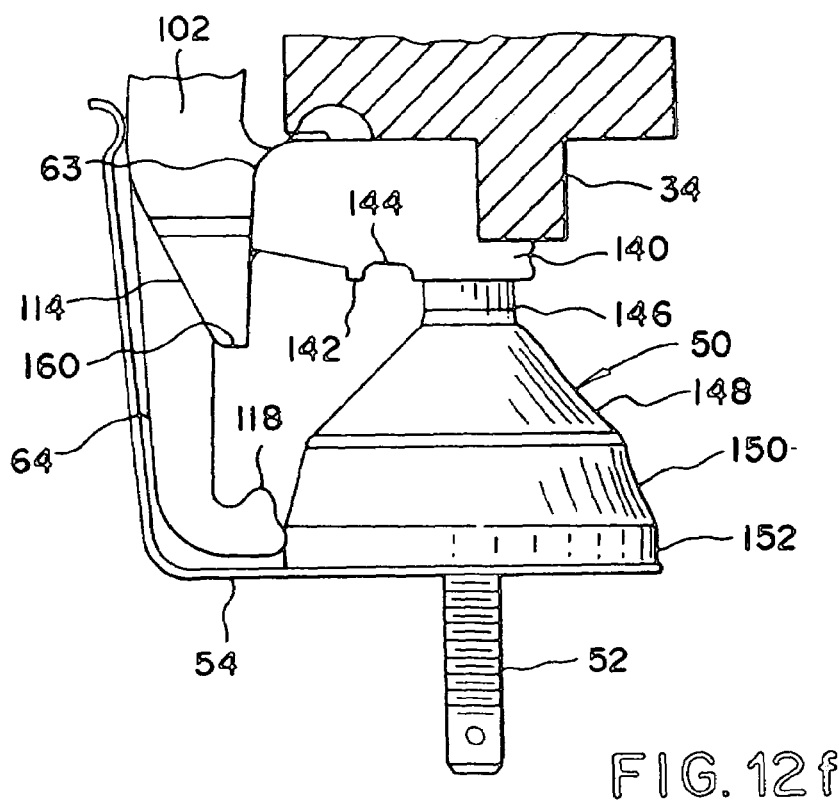

The final state is shown schematically in FIG. 12f, where drive cam 50 has reached its final position on lead screw 52. Cam follower 116 has moved from the shallow tapered surface 150 to a lower cylindrical surface 152 on drive cam 50. No changes in reaction forces are seen, since the coupler link 64 has experienced no further deflection on the lower cylindrical surface 152 than that seen at the end of the shallow tapered surface 150. This eliminates the need to have a precise stopping point for the drive motor 22, and allows motor slip to occur with out changing the clamping force.

The invention has been described with reference to one or more preferred embodiments. However, it will be appreciated that a person of ordinary skill in the art can effect variations and modifications, without departing from the scope of the invention.

PARTS LIST 10 deployed member
12 flexured ball assembly
14 latch mechanism
16 reference structure
18 latching pawl
20 mounting plate
22 drive motor
24 latch body
26 latch housing
28 ball seat
30 clamp plate
32 ball
34 spherical bearing assembly
36 spherical bearing
38a bearing seat
38b bearing cup
39 circular grooves
40 bearing housing
41 mating circular grooves
42 ball stem
44 axial bore
48 lead screw/cam assembly
50 drive cam
52 lead screw
54 spring element
56 motor coupling
58 lower surface of bearing housing 40
60 motor coupling pin
62 anti-rotation flange
63 secondary cam
64 coupler link
68 drive shaft
72 motor mount
76 actuating arm
80 flexured stem
82 cylindrical mounting shaft
84 clamp plate retaining flange
86 clamp plate centering shoulder
88 threaded shank
90 compliant member
92 hole
94 clamp plate inner bore
96 clamp plate conical surface
100 linkage assembly
102 follower link
104 follower link arm
106 upper pivot pin
108 bore
110 pivot bore
112 pivot bar
114 nubs
116 cam follower
118 tab
126 axial bore
134 upper clearance slot
136 lower clearance slot
137 drive pin
139 drive slot
140 flange
142 lip
144 upper cam surface
146 cylindrical surface
148 steep tapered surface
150 shallow tapered surface
152 lower cylindrical surfaced
160 secondary cam follower

What is claimed is:

1. A reusable self-aligning precision latch, comprising:
   a) a latch body for mounting a latch assembly, including an interface cone;
   b) a lead screw, coupled to the latch body on one end, that pivots at an interface on the latch body allowing for self-alignment;
   c) a drive cam having a plurality of surfaces and positioned on the lead screw engaging a plurality of linkage assemblies such that at least two links are driven;
   d) a flexured ball assembly having a ball and a floating clamp plate in contact with the ball, said floating clamp plate maintained perpendicularly to an axis of the flexured ball assembly by a compliant member;
   said flexured ball assembly clamped by the plurality of linkage assemblies to the latch body with the floating clamp plate such that all clamping forces between the floating clamp plate and the latch body are equalized; and
   e) a motor for closing and opening the self-aligning precision latch by turning the lead screw to apply and release, respectively, the clamping forces between the pivoting clamp plate and the latch body.

2. The reusable self-aligning precision latch claimed in claim 1, wherein the motor and the lead screw combine to provide controlled movement of a plurality of clamping pawls.

3. The reusable self-aligning precision latch claimed in claim 1, wherein the plurality of linkage assemblies includes a coupler link and a follower link.

4. The reusable self-aligning precision latch claimed in claim 3, wherein a nub on the coupler link is positively engaged on one of the plurality of surfaces of the drive cam.

5. The reusable self-aligning precision latch claimed in claim 1, wherein the plurality of linkage assemblies comprised of a coupler link, a follower link, and a drive cam form a four bar linkage mechanism.

6. The reusable self-aligning precision latch claimed in claim 5, wherein the follower link is grounded upon one of the plurality of surfaces of the drive cam such that a simple lever mechanism remains.

7. The reusable self-aligning precision latch claimed in claim 6, wherein the follower link is driven by the drive cam to apply the clamping forces.

8. The reusable self-aligning precision latch claimed in claim 1, wherein the flexured ball assembly includes a flexure having a retaining flange for capturing the compliant member prior to latching.

9. The reusable self-aligning precision latch claimed in claim 8, wherein the compliant member is selected from the group consisting of an O-ring, a rubber band, and a spring.

10. A method for latching, employing a kinematic, self-aligning precision latch, comprising the steps of:
   a) holding the precision latch open in its initial state to provide unobstructed axial and radial ball seat clearances to receive a flexured ball assembly;
   b) positioning a plurality of clamping pawls over a floating clamp plate of the flexured ball assembly to fully capture the clamp plate preventing displacement from a latch seat;
   c) making contact with the clamp plate with a follower link in a manner as to equalize forces on the clamp plate wherein the clamp plate is in contact with a ball and maintained pivotably perpendicular to an axis of the flexured ball assembly by a compliant member;
   d) applying a force to the clamp plate by effectively grounding the follower link of a four bar mechanism, thereby, forming a simple lever to obtain mechanical advantage at the clamp plate;
   e) providing a clamping force on the clamp plate by deforming a coupler link via a cam; and
   f) locking the precision latch in its final state with action from a fixed displacement portion of the cam.

11. The method claimed in claim 10, wherein the step of positioning a plurality of clamping pawls over a clamp plate includes combining action of a motor and a lead screw to provide controlled movement of the plurality of clamping pawls.

12. The method claimed in claim 10, wherein the follower link is a part of a linkage assembly that also includes a coupler link.

13. The method claimed in claim 12, wherein a nub on the coupler link is positively engaged on one of a plurality of surfaces of the cam.

14. The method claimed in claim 12, wherein the linkage assembly comprised of the coupler link, the follower link, and the cam form a four bar linkage mechanism.

15. The method claimed in claim 14, wherein the follower link is grounded upon one of the plurality of surfaces of the cam such that a simple lever mechanism remains.

16. The method claimed in claim 15, wherein the follower link is driven by the drive cam to apply the clamping force.

* * * * *